Jan. 8, 1946.    R. LEE    2,392,487
RECORDING INSTRUMENT
Filed Sept. 27, 1941
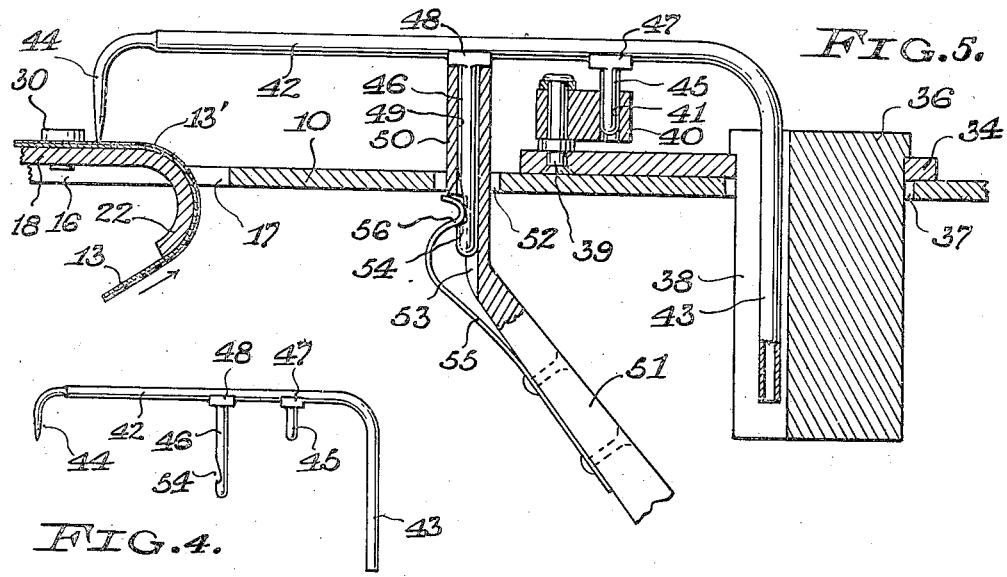
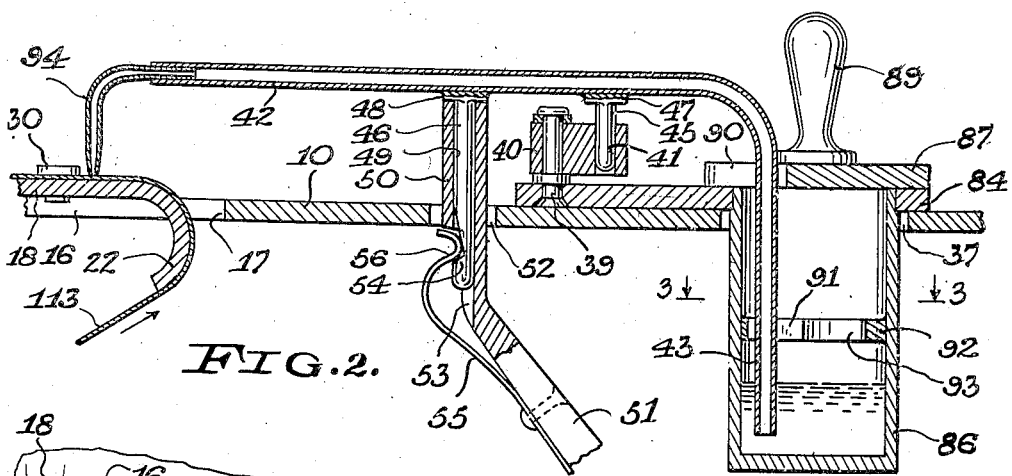
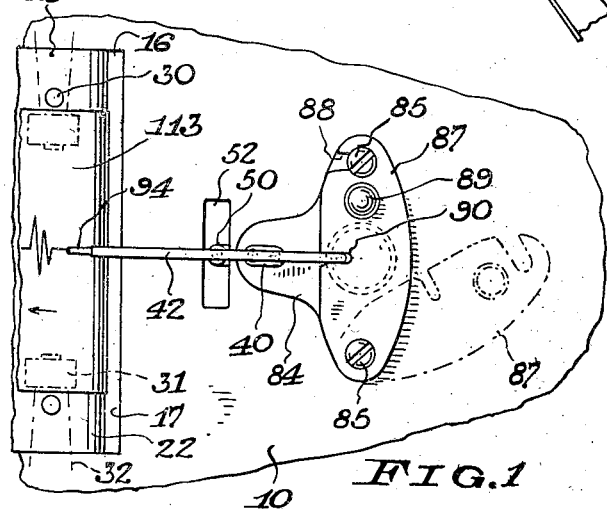
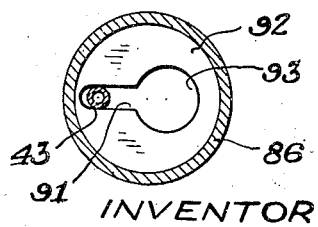
INVENTOR
ROYAL LEE
BY Christopher L. Waal
ATTORNEY Patented Jan. 8, 1946

2,392,487

UNITED STATES PATENT OFFICE 2,392,487

RECORDING INSTRUMENT

Royal Lee, Milwaukee, Wis.

Application September 27, 1941, Serial No. 412,614

3 Claims. (Cl. 234—72)

The present invention relates to recording instruments of the general type in which a marking device is adapted to cooperate with a movable record sheet or chart.

An object of the invention is to provide an improved instrument adapted for recording representations of wave phenomena on a record sheet and having a swingable recording arm which is so mounted and arranged that a marking element thereof will have an approximately straight line movement transversely of the path of travel of the record sheet.

Another object of the invention is to provide simple and inexpensive means for mounting and actuating the recording arm and for permitting easy detachment and replacement of the arm.

A further object is to provide a recording instrument which by relatively simple changes can be arranged to either engrave or ink the record sheet.

The invention further consists in the several features hereinafter described and claimed.

In the accompanying drawing, illustrating certain embodiments of the invention,

Fig. 1 is a fragmentary top view of a recording instrument, more particularly a cardiograph, constructed in accordance with the invention;

Fig. 2 is a longitudinal sectional elevation of the instrument, showing a swingable recording arm and its mounting;

Fig. 3 is a detail sectional view taken along the line 3—3 of Fig. 2;

Fig. 4 is a detail side view of the detached recording arm, and

Fig. 5 is a longitudinal sectional elevation of a modified form of recording instrument including a recording arm adapted for producing an engraved record.

In the drawing, 10 designates the top plate of a recording instrument, such as a cardiograph. A record sheet, preferably in the form of a paper strip or tape 113, is adapted to travel over the top plate and is unwound from a roll, not shown, the tape passing upwardly through a rectangular opening 16 formed in the top plate. The opening 16 is normally closed, except for a slot 17 formed at one end thereof, by a detachable elongated cover plate 18 which rests on the top plate and has a smooth, polished upper surface on which the tape 113 is adapted to slidably bear.

The tape 113 passes upwardly through the slot 17 and slidably bears on a rounded downwardly projecting lip or bead 22 formed along an end of the cover plate, this lip defining an edge of the slot 17. The tape is drawn along the cover plate at a suitable uniform rate of speed, as by any appropriate feeding means, not shown. Near the slot 17 the tape is confined against lateral shifting by short guide studs 30 upstanding from the cover plate 18, and the tape is held down against the cover plate by rollers 31 carried on the free ends of spring-pressed arms 32, these arms being swingable upwardly to avoid interference with the replacement of the tape.

In the form of instrument shown in Figs. 1 to 4, a mounting plate 84 is detachably secured to the top plate 10, as by screws 85, the mounting plate being near the tape slot 17 on the top plate. The mounting plate rigidly carries thereon a cylindrical cup member 86 which forms a well or reservoir for ink or other marking fluid and extends vertically downward through an opening 37 in the top plate. The cup member has a closure plate 87 which at one end is pivotally secured to one of the screws 85 for the mounting plate and at the other end has a notch 88 adapted to receive the other screw. A knob 89 on the pivoted closure plate facilitates opening and closing of this plate. A guide slot or channel 90 is formed in the closure plate at the side thereof nearest the tape slot and has opposite parallel side walls, the projected center line of the paper tape lying in the central vertical plane of the guide slot. Another guide slot or channel 91 in the same vertical plane is formed in a horizontal guide disk 92 which is rigidly secured in the cup member 86. The guide slot 91 communicates with an enlarged opening 93 in the guide plate 92 to facilitate installation of a recording arm hereinafter described. In the vertical plane of the guide slots, and at a point between the guide slot 90 and the tape slot 17, is an upstanding pivot pin 39 rigidly secured to the mounting plate. A radius link 40 is swingably carried on the pivot pin 39 and projects toward the guide slot 90, the free end portion of the link having a vertical bore 41.

A swingable recording arm or bar 42, preferably formed of light metal tubing, has a downwardly bent portion 43 at one end forming a vertical pivot projection slidably fitting in the guide slots 90 and 91. An angular tubular stylus 94, preferably of glass, has a horizontal portion detachably fitting in the free end of the hollow recording arm 42 and has a downwardly bent portion or projection with a tapered open end which forms a pen point adapted to bear on the paper tape 113 at a region over the cover plate 18. The recording arm forms a syphon tube for the ink.

At intermediate points the recording arm has two spaced downwardly projecting prongs or pins 45 and 46, all the projecting parts of the arm lying in the same vertical plane. The projections 45 and 46 have rounded lower ends and have respective heads 47 and 48 saddled onto the arm and secured thereto as by soldering. The projection 45, which lies between the projections 43 and 46, is adapted to enter and slidably fit in the vertical bore 41 of the radius link 40. The projection 46, which is somewhat longer than the projection 45, is adapted to enter and slidably fit in the vertical bore 49 of a sleeve 50 forming the upper end portion of an actuator bar 51, there being a transverse slot 52 formed in the top plate 10 to provide clearance for the actuator bar. The lower portion of the sleeve 50 is cut away at 53 along an axial plane to expose a notch 54 formed in the side wall of the pin 46. A latch spring 55 is riveted or otherwise secured to the actuator bar 51 and has a bent free end 56 forming a detent entering the notch 54 in the pin 46, thus releasably retaining the recording arm in its operative position in which it is supported by the actuator bar.

The actuator bar 51 has a horizontal motion of translation transverse to the recording arm and is operated by any suitable motor element, not shown. By way of example, the motor element may be in the form of an electrodynamic device of the moving-coil loud-speaker type.

When ink is to be deposited in the cup member 86, the closure plate 87 is swung to the open position shown by broken lines in Fig. 1. If desired, the closure plate may also be swung open to facilitate the replacement of the recording arm.

In the operation of the instrument of Figs. 1 to 4, the paper tape 113 is drawn at a suitable uniform rate of speed over the cover plate 18, the tape being kept taut in any suitable manner. The motor element (not shown) for the actuator bar 51 is energized in accordance with the phenomena to be recorded, such as cardiac waves or sounds. This produces transverse vibrations of the actuator bar 51, causing the connected recording arm 42 to swing or oscillate about its pivot projection 43 in accordance with the impressed vibrations, and thereby causing the stylus 94 to form a thin wave-like ink line on the traveling paper tape. During the operation of the instrument, the ink flows through the tubular recording arm by capillary action. In the excursions of the swingable recording arm on either side of center, the pivot projection 43 of the arm is slidably guided in the slots or channels 90 and 91, and the radius link 40 has a forward component of movement which substantially straightens out the path of travel of the stylus. The path of the stylus point closely approximates a straight line, thus minimizing distortion of the recorded tracing. The recording arm has a multiplying action as the actuator bar 51 is connected to an intermediate point of the arm. The length of the recording arm is preferably several times as great as the maximum amplitude of oscillation. For any given length of recording arm and amplitude of oscillation, a suitable radius and position for the radius link 40 can readily be found.

When it is desired to replace the paper tape, the recording arm 42 is detached from its mounting by merely lifting it therefrom under slight pressure sufficient to release the latch spring 55, and the cover plate 18 is temporarily removed from the top plate 10, affording access to the opening 16. After a new paper tape is installed, the recording arm is easily replaced on its mounting, a slight downward pressure on the partially mounted arm serving to engage the latch spring 55.

While the instrument is more particularly adapted for the recording of wave phenomena, it is obviously not restricted to such use. If desired, the recording arm may be arranged to deflect in one direction from a datum line, instead of in both directions. The recording instrument is here shown to be disposed in a horizontal position, but it is also operative in various other positions.

The form of the invention shown in Fig. 5 is generally similar to that of Figs. 1 to 4, except that the recording arm is adapted to produce an engraved line on a traveling paper tape 13 having a wax coating 13'. The inking stylus 94 of Fig. 2 is replaced by a bent stylus 44, the horizontal portion of the stylus detachably fitting in the free end of the hollow recording arm 42, and the downwardly projecting portion of the stylus having an etching point adapted to bear on the paper tape. In practice, the tape may be colored and the wax coating may be white, so that when the stylus cuts through the wax a thin colored line or tracing will be produced. If desired, the color relation of the tape and coating may be reversed, causing a light line to be produced on a dark background.

The instrument of Fig. 5 has a mounting plate 34 similar to the mounting plate 84 and rigidly carrying thereon a cylindrical plug or body 36 which extends vertically downward through an opening 37 in the top plate. A vertical radial guide slot or channel 38 is formed in the body 36 at the side of the body nearest the tape slot 17, the channel having opposite parallel side walls, and the projected center line of the paper tape lying in the central plane of the channel. The channel slidably receives the pivot projection 43 of the recording arm.

If it is desired to use the instrument of Fig. 2 for engraving a wax-coated tape, it is only necessary to substitute the engraving stylus 44 for the inking stylus 94, or to substitute a new arm having an engraving stylus.

What I claim as new and desire to secure by Letters Patent is:

1. In a recording instrument, a swingable recording arm adapted to move over a record sheet in response to phenomena to be recorded, said arm having a marking element and a pivot projection distant from said marking element, and said arm forming a conduit for conducting marking fluid to said sheet, a reservoir for marking fluid into which said pivot projection extends, said pivot projection having a fluid passage, and a shiftable closure plate for said reservoir having a notch for slidably guiding said pivot projection.

2. In a recording instrument, a swingable recording arm adapted to move over a record sheet in response to phenomena to be recorded, said arm having a marking element and a pivot projection distant from said marking element, and said arm forming a conduit for conducting marking fluid to said sheet, a reservoir for marking fluid into which said pivot projection extends, said pivot projection having a fluid passage, a shiftable closure plate for said reservoir having a notch for guiding said pivot projection, and slotted guide means in said reservoir for guiding the lower portion of said pivot projection.

3. In a recording instrument, a swingable tubular recording arm adapted to move over a record sheet in response to phenomena to be recorded and forming a conduit for marking fluid, said arm having a stylus adapted to deposit marking fluid on said record sheet, and said arm having a downwardly projecting pivot portion with a fluid passage, a reservoir for marking fluid into which said downwardly projecting pivot portion of the arm extends, means in said reservoir for slidably guiding said pivot portion, and means for swingably supporting said arm.

ROYAL LEE.